United States Patent
Sarel et al.

(10) Patent No.: US 12,032,589 B2
(45) Date of Patent: Jul. 9, 2024

(54) BYPASSING DATABASE AUTOMATIONS

(71) Applicant: OWNBACKUP LTD., Tel Aviv (IL)

(72) Inventors: Liron Sarel, Kfar Saba (IL); Bar Jakubowicz, Herzliya (IL)

(73) Assignee: OWN DATA COMPANY LTD., Tel Aviv (IL)

( * ) Notice: Subject to any disclaimer, the term of this patent is extended or adjusted under 35 U.S.C. 154(b) by 16 days.

(21) Appl. No.: 18/071,679

(22) Filed: Nov. 30, 2022

(65) Prior Publication Data

US 2024/0176796 A1  May 30, 2024

(51) Int. Cl.
*G06F 16/25* (2019.01)
*G06F 16/21* (2019.01)
*G06F 16/22* (2019.01)

(52) U.S. Cl.
CPC .......... *G06F 16/258* (2019.01); *G06F 16/211* (2019.01); *G06F 16/2282* (2019.01)

(58) Field of Classification Search
CPC ............................ G06F 16/258; G06F 16/2282
USPC ........................................................ 707/756
See application file for complete search history.

(56) References Cited

U.S. PATENT DOCUMENTS

| | | | | | |
|---|---|---|---|---|---|
| 6,401,079 | B1 * | 6/2002 | Kahn | .................. | G06Q 20/102 705/30 |
| 2003/0199998 | A1 * | 10/2003 | Herberth | .............. | G05B 19/042 700/83 |
| 2014/0297354 | A1 * | 10/2014 | Kogiso | .................... | G06F 9/46 705/7.26 |
| 2019/0278862 | A1 * | 9/2019 | Kapoor | ............... | G06F 16/2282 |
| 2020/0092178 | A1 * | 3/2020 | Nelson | ............. | G06Q 10/06316 |
| 2021/0042104 | A1 * | 2/2021 | Tashkandi | ................. | G06F 8/77 |
| 2023/0359659 | A1 * | 11/2023 | Granit | ................... | G06F 16/355 |

OTHER PUBLICATIONS

Salesforce, Inc., "Object Manager", pp. 1-3, year 2000-2023 https://documentation.b2c.commercecloud.salesforce.com/DOC3/index.jsp?topic=%2Fcom.demandware.dochelp%2FOrderManagement%2FAdministration%2FAdminObjectMgr.html.

* cited by examiner

*Primary Examiner* — Muluemebet Gurmu
(74) *Attorney, Agent, or Firm* — KLIGLER & ASSOCIATES PATENT ATTORNEYS LTD.

(57) ABSTRACT

Methods, storage systems and computer program products implement embodiments of the present invention for controlling execution of automations that are associated with a table in a database. To implement these embodiments, respective bypass flags are defined in the automations, and an input indicating a bypass setting is received. In response to initiating execution of process for managing the table, the bypass flags are compared to the bypass setting so as to determine whether to permit or to bypass each given automation. Finally, during execution of the process, execution of the permitted automations is allowed, and execution of the bypassed automations is prevented.

19 Claims, 2 Drawing Sheets

BYPASSING DATABASE AUTOMATIONS

FIELD OF THE INVENTION

The present invention relates generally to data management, and particularly to managing the execution of automations associated with database tables.

BACKGROUND OF THE INVENTION

When managing data stored in a database and applications that access the database, a database management system (DBMS) can define and deploy automations that can monitor the database so as to perform operations in response to modification of specific data in the database. These automations can be used to ensure data integrity and referential integrity. Examples of these automations include, but are not limited to, validations and triggers.

In data validation, the accuracy and quality of source data is checked before the data is used, imported or otherwise processed. Different types of validations can be performed depending on destination constraints or objectives, and can include:

- A data type validation that checks whether or not individual characters received through user input are consistent with the expected input. For example, an integer field may require input to use only characters 0 through 9.
- A range validation that compares input to a (minimum/maximum) range. For example, a counter value may be required to be a non-negative integer.
- A constraint validation that examines input for consistency with a test that evaluates a sequence of characters. For example, a password may be required to meet a minimum length and contain characters from multiple categories.
- A code and cross-reference validation that checks if input data is consistent with one or more predefined rules. For example, a user-provided country code might be required to identify a current geographic region.
- A consistency validation that ensures that data is logical. For example, the delivery date of an order can be prohibited from preceding its shipment date.

A database trigger comprises procedural code that automatically executes in response to certain events on a particular table in a database. For example, if a database comprises an accounts table (comprising account records) that is linked to a contacts table (comprising contact records), a given automation may comprise adding a new contact record to the contacts table upon detecting a new account record in the accounts table, and then linking the new contact record to the new account record. Similarly, a given automation for this database may comprise deleting any contact records related to a given account record upon deleting the given account record.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method for controlling execution of automations that are associated with a table in a database, the method including defining respective bypass flags in the automations, receiving an input indicating a bypass setting, initiating execution of process for managing the table, responsively to initiation of the execution, comparing the bypass flags to the bypass setting so as to determine whether to permit or to bypass each given automation, and during execution of the process, allowing execution of the permitted automations and preventing execution of the bypassed automations.

In one embodiment, managing the table includes loading data to the table.

In some embodiments, the data includes a first format, wherein the records include a second format, and wherein loading the data includes converting the data from the first format to the second format.

In other embodiments, loading the data into records of the table includes copying the data from a first instance of the table to a second instance of the table.

In an additional embodiment, managing the table includes deleting data from the table.

In another embodiment, managing the table includes modifying data in the table.

In a further embodiment, the given automation includes performing a validation.

In a supplemental embodiment, the given automation includes executing a trigger.

In an additional embodiment, the given automation includes presenting a user interface element.

There is also provided, in accordance with an embodiment of the present invention, an apparatus for controlling execution of automations that are associated with a table in a database, the apparatus including a memory configured to store a process for managing the table, and a processor configured to define respective bypass flags in the automations, to receive an input indicating a bypass setting, to load and initiate execution, from the memory, of process for managing the table, responsively to initiation of the execution, to compare the bypass flags to the bypass setting so as to determine whether to permit or to bypass each given automation, and during execution of the process, to allow execution of the permitted automations and preventing execution of the bypassed automations.

There is additionally provided, in accordance with an embodiment of the present invention, a computer software product for controlling execution of automations that are associated with a table in a database, the product including a non-transitory computer-readable medium, in which program instructions are stored, which instructions, when read by a computer, cause the computer to define respective bypass flags in the automations, to receive an input indicating a bypass setting, to initiate execution of a process for managing the table, responsively to initiation of the execution, to compare the bypass flags to the bypass setting so as to determine whether to permit or to bypass each given automation, and during execution of the process, to allow execution of the permitted automations and to prevent execution of the bypassed automations.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Automations can be resource intensive. For example, a database may be configured to comprise an employee table and a set of related tables, such as a tax table, a vacation table, and a salary table. In this configuration, a given automation may comprise a trigger that instructs a database management system (DBMS) to add new records to the related tax, vacation, and salary tables upon detecting a new record added to the employee table.

There may be instances when it is desirable to turn off automations, specifically during bulk operations (e.g., restoring, migrating or deleting) large numbers (e.g., tens of thousands) of records in a table. Using the example described supra, if 10,000 records are restored to the employee table described supra, then the trigger will add 10,000 records to each of the related tax, vacation and salary tables (i.e., totaling 30,000 additional records). In addition to being resource intensive, the records added by the trigger might need to be deleted once the records from the related tables are also restored.

The term "automation," as used in the present description and in the claims, means a software routine that is associated with a table in a database by means of a code notation attached to (i.e., computer executable code that is associated with) the table and is executed automatically by the DBMS when the table is accessed.

Embodiments of the present invention provide methods and systems for controlling execution of automations that are associated with a table in a database. As described hereinbelow, respective bypass flags are defined in the automations, and an input is received indicating a bypass setting. In response to initiating execution of a process for managing the table, the bypass flags are compared to the bypass setting so as to determine whether to permit or to bypass each given automation. Finally, during execution of the process, execution of the permitted automations is allowed, and execution of the bypassed automations is prevented.

In embodiments described herein:
"Permitting" a given automation means that the DBMS executes the given automation in response to the code notation upon accessing the table
"Bypassing" a given automation means that the DBMS does not execute the given automation upon accessing the table notwithstanding the code notation.

In one embodiment, all the automations for the table may be bypassed in response to comparing the bypass flags to the bypass setting. In another embodiment, a subset of the automations for the table may be bypassed in response to comparing the bypass flags to the bypass setting. Therefore, systems implementing embodiments of the present invention can provide system administrators a tool that can be used to customize automation selection, thereby providing greater control over system resources and performance.

System Description

Figure 1:
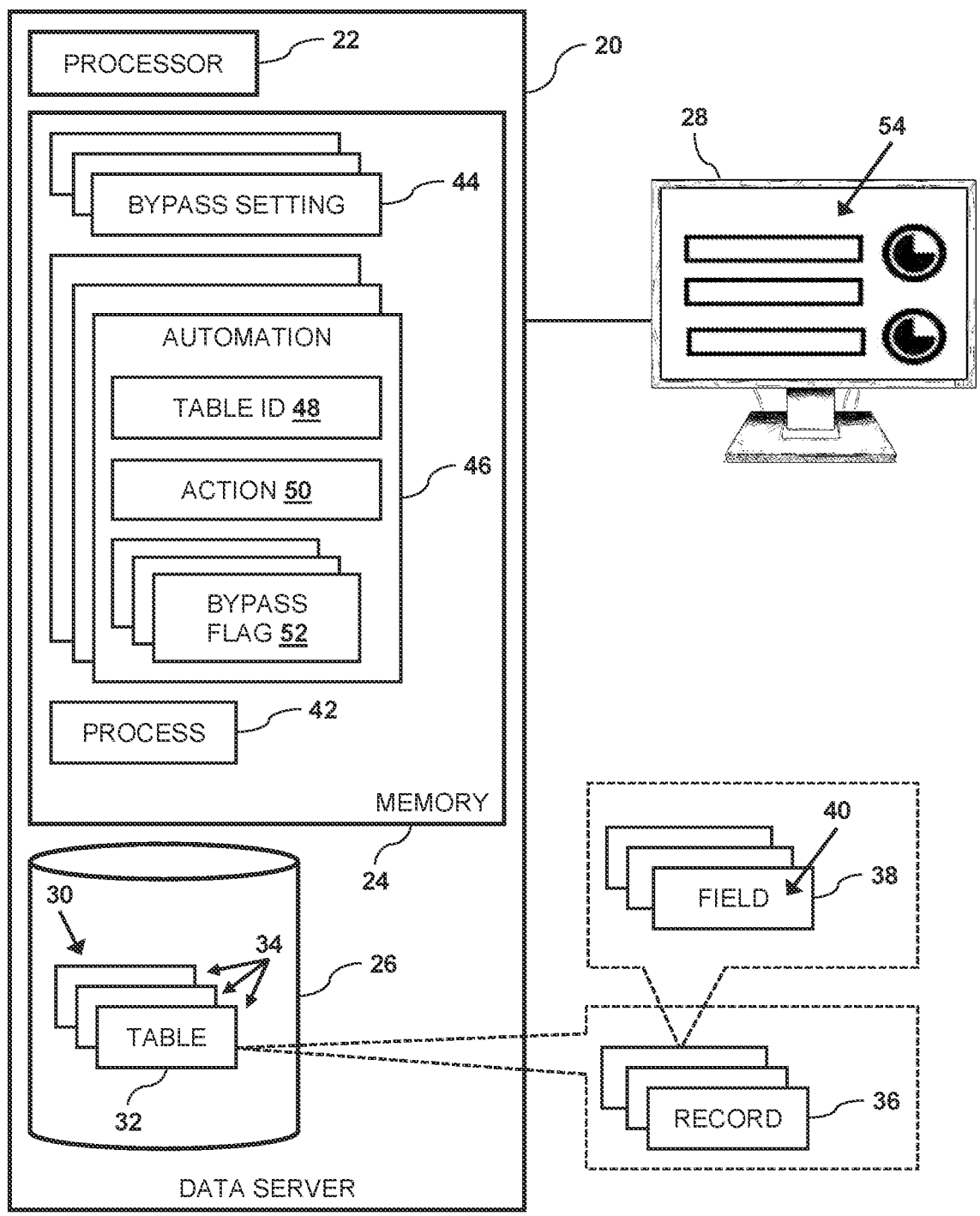
FIG. 1 is a block diagram that schematically shows a data server configured to manage automations whose executions can toggled by respective bypass flags, in accordance with an embodiment of the present invention.

FIG. 1 is a block diagram that schematically shows a data server 20, in accordance with an embodiment of the present invention. In the configuration shown in FIG. 1, data server 20 comprises a processor 22, a memory 24, a storage device 26, and a display 28.

Storage device 26 may store a database 30 comprising a set of tables 32 having respective table identifiers (IDs) 34. Each given table 32 comprises a set of records 36, and each given record 36 comprises a set of fields 38 that store data 40.

Memory 24 can store a process 42 that manages one or mor tables 32, a set of bypass settings 44 for process 42, and a set of automations 46. In embodiments described herein, automations 46 are associated with table 32, and bypass settings 44 are associated with process 42. This is to ensure that that processor 22 only uses the bypass settings associated with process 42 when executing process 42 (i.e., and not any other processes executed by processor 22).

In some embodiments, process 42 comprises computer executable code that processor 22 can execute so as to manage tables 32 by performing bulk data operations such as restoring data 40 (i.e., from a backup) to a given table 32, migrating multiple records 36 from a first given table 32 to a second given table 32, and deleting a plurality of records 36 from a given table 32.

In some embodiments, memory 24 may store multiple processes 42, wherein some of the processes perform bulk data operations (as described supra), and the other processes perform non-bulk operations such as order entry. In these embodiments, different sets of bypass settings 44 can be associated with different processes 42. This ensures, for example, that processor 22 does not use the bypass settings for the processes that perform bulk operations on database 30 when executing the processes that perform non-bulk operations on the database.

In the configuration shown in FIG. 1, each given automation 46 comprises:
A table ID 48 that references a given table ID 34. In embodiments described herein, each automation 46 is associated with a given table 32 (i.e., referenced by a given table ID 34). For example, in the automation described supra where a given automation 46 may comprise a trigger that adds new records 36 to the tax, the vacation, and the salary tables upon detecting a new record 36 added to the employee table. Similarly (i.e., in the example described supra), upon deleting a given record 36 from the employee table, a given automation 46 may comprise a trigger that deletes any related records 36 (i.e., related to the given record) from the tax, the vacation, and the salary tables. In these examples, the associated table 42 for these automations comprises the employee table, since the trigger is in response to detecting a change in the employee table.
An action 50 that processor 22 performs in the given automation. Examples of actions 50 are described hereinbelow.
One or more bypass flags 52. In embodiments described herein, processor 22 can analyze the one or more bypass settings and the one or more bypass flags so as to determine whether to permit or to prevent execution of the given automation. Bypass settings 44 and bypass flags 52 are described hereinbelow.

A first example of a given action 50 may comprise a trigger action. In the example described supra, the trigger operation comprises adding new records 36 to the tax, the vacation, and the salary tables. A given automation 46 whose respective action 50 comprises a trigger action may also be referred to as a trigger automation (or simply a trigger).

A second example of a given action 50 may comprise a validation action. As described supra, validations include data type validations, range validations, constraint validations, code and cross-reference validations, and consistency validations.

For example, if the records in a given table 32 comprises AnnualRevenue and BillingCountry fields 38, then the validation operation may comprise rendering, on display 28, an error message "Please fill in Annual Revenue" if the AnnualRevenue field is blank and the BillingCountry field stores "United States".

A given automation 46 whose respective action 50 comprises a validation action may also be referred to as a validation automation (or simply a validation).

Processor 22 may be configured to manage (i.e., present, modify and remove) one or more user interface (UI) elements 54 on display 28 when managing data 40 in a given table 32. In one example, a given UI element 54 may comprise a data entry screen that processor 22 renders on display 28 for data stored in one or more tables 32. In another example, a given UI element may comprise a report or a chart that processor 22 renders on display 28 in response to analysis of data 40. In an additional automation embodiment, the given automation may manage the rendering of one or more UI elements 54.

A third example of a given action 50 may comprise a display action that managed the rendering of one or more UI elements on display 28. A given automation 46 whose respective action 50 comprises presents one or more UI elements on display 28 may also be referred to as a screen automation, a display automation, a presentation automation, or a rendering automation.

Processor 22 comprises a general-purpose central processing unit (CPU) or a special-purpose embedded processor, which is programmed in software or firmware to carry out the functions described herein. This software may be downloaded to data server 20 in electronic form, over a network, for example. Additionally or alternatively, the software may be stored on tangible, non-transitory computer-readable media, such as optical, magnetic, or electronic memory media. Further additionally or alternatively, at least some of the functions of processor 22 may be carried out by hard-wired or programmable digital logic circuits.

In some embodiments, the functionality of some or all of the embodiments (described herein that are) performed by data server 20 may be deployed in a data cloud and/or as one or more physical and/or virtual machines.

Examples of memory 24 and storage device 26 include dynamic random-access memories, non-volatile random-access memories, and non-volatile storage devices such as hard disk drives and solid-state disk drives.

Automation Management During Bulk Data Operations

Figure 2:
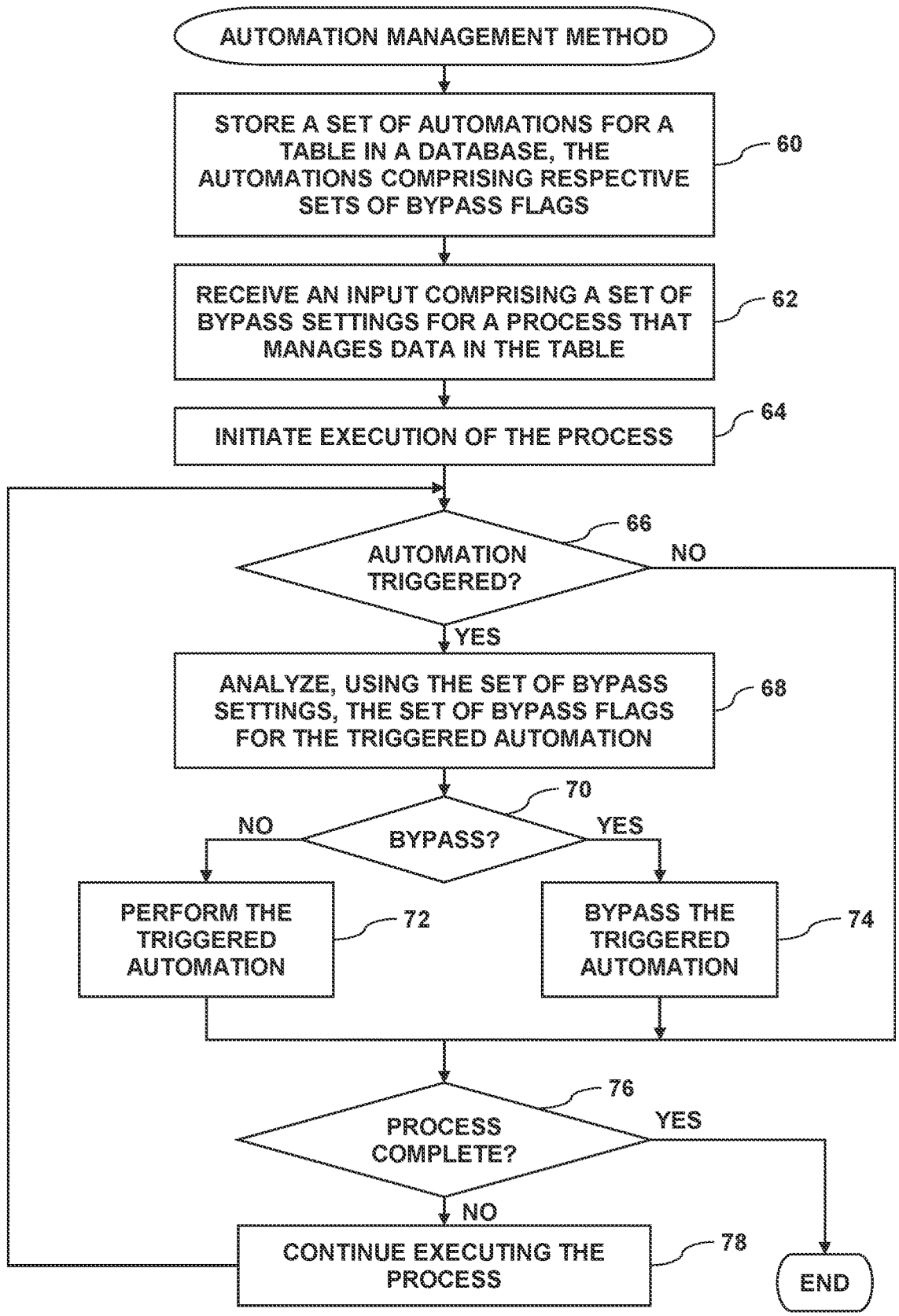
FIG. 2 is a flow diagram that schematically illustrates a method of managing and using the automations whose executions can toggled by respective bypass flags, in accordance with an embodiment of the present invention.

FIG. 2 is a flow diagram that schematically illustrates a method of determining whether to allow or to prevent execution of automations 46 while executing a given process 42, in accordance with an embodiment of the present invention.

In step 60, processor 22 stores, to memory 24, a set of automations 46. As described supra, each given automation is associated with a given table 32 and comprises a set of bypass flags 52.

In step 62, processor 22 receives an input comprising a set of bypass settings 44. In the configuration shown in FIG. 1, processor 22 can receive the input by storing the set of (predefined) bypass settings from memory 24. As described supra, bypass settings 44 are associated with process 42.

In step 64, processor 22 initiates, from memory 24, execution of process 42 that manages one or more tables 32 in database 30. In embodiments described herein, the operations comprise bulk data operations on database 30.

In a first bulk data operation embodiment, managing a given table 32 comprises loading records 36 (storing data 40 as described in the description referencing FIG. 1 hereinabove) to the given table. In a migration embodiment, processor 22 can load records to the given table by migrating data 40 from a first given table 32 (i.e., a first instance of the given table) to a second given table 32 (i.e., a second instance of the given table).

In a first migration embodiment example, processor 22 can store the first instance of the given table in a test environment (not shown) on storage device 26, and then store the second instance of the given table in a production environment (not shown) on the storage device. In a second migration example, processor 22 can restore records 36 from a backup of the given table to the given table.

In a second migration example, the first given table may store its respective data 40 in a first format, the second given table may store its respective data 40 in a second format, and processor 22 can migrate the data from the first given table to the second given table by converting the data in the first given table from the first format to the second format. For example, the second given table may comprise an object managed by SALESFORCE™ (produced by salesforce.com, inc., Salesforce Tower 3rd Floor, 415 Mission Street, San Francisco, CA 94105 USA), and the first given table may comprise a comma-separated value (CSV) text file that stores a backup of the object. In this example, processor 22 can restore data to the first given table, by retrieving one or more records 36 from the CSV text file (i.e., the first given table), converting the data in the one or more retrieved records to SALESFORCE™ object format, and storing the converted data to a one or more corresponding records 36 in the SALESFORCE™ object (i.e., the second given table).

In a second bulk data operation embodiment, managing a given table 32 may comprise deleting a subset (or all) of the records in the given table.

In a third bulk data operation embodiment, managing a given table 32 may comprise updating the data in one or more fields 38 of one or more records 36 in the given table.

In step 66, while processor 22 is executing process 64, the processor checks whether the process triggers any automation 46.

If, in step 66, processor 22 detects a triggered automation 46, then in step 68, the processor analyzes the one or more bypass flags for the given automation and the one or more bypass setting so as to determine whether to perform the triggered automation or to bypass the triggered automation.

As described supra, each given automation may comprise one or more bypass flags 52, and process 42 may have one or more bypass settings. Examples of this analysis include the following bypass embodiments:

In a first bypass embodiment, a given bypass setting 44 may comprise a global bypass setting. In this embodiment, when processor 22 detects the global bypass setting, the processor bypass execution of all automations 46 for process 42.

In a second bypass embodiment, a given bypass setting 44 may comprise one or more table IDs. In this embodiment, when processor 22 detects any of the one or more table IDs in the given bypass setting, the processor can bypass execution all automations 46 having matching table IDs 48.

Alternatively, when processor 22 detects the any of the one or more table IDs in the given bypass setting, the processor can allow execution all automations 46 that are related any of the tables having matching table IDs 48.

In a third bypass embodiment, bypass flags 52 may store respective rule names, and a given bypass setting 44 may comprise one or more rule names. In this embodiment, when processor 22 detects any rule names in the given bypass setting, the processor can bypass execution all automations 46 whose respective bypass flags 52 store any of the one or more rule names in the given bypass setting. Alternatively, when processor 22 detects any rule names in the given bypass setting, the processor can allow execution all automations 46 whose respective bypass flags 52 store any of the one or more rule names in the given bypass setting.

In a fourth bypass embodiment, bypass flags 52 may store respective rule categories, and a given bypass setting 44 may comprise one or more rule categories. Examples of the rule categories include, but are not limited to, triggers and validations. In this embodiment, when processor 22 detects any rule categories in the given bypass setting, the processor can bypass execution all automations 46 whose respective bypass flags 52 store any of the one or more rule categories in the given bypass setting. Alternatively, when processor 22 detects any rule categories in the given bypass setting, the processor can allow execution all automations 46 whose respective bypass flags 52 store any of the one or more rule categories in the given bypass setting. For example, when updating a given table 32, a system administrator (not shown) may configure bypass settings 44 so as to permit execution of all validation automations 46, but to prevent execution of any trigger automations 46.

In a fifth bypass embodiment, bypass flags 52 and bypass settings 44 may comprise a one or more assignment statements that assign a value (e.g., a Boolean value) to a parameter. In this embodiment, when processor 22 detects an assignment statement in a given bypass setting 44, the processor can bypass execution of all automations 46 (i.e., for the executing process) if the processor detects a given bypass flag comprising a matching assignment statement. Alternatively, when processor 22 detects an assignment statement in a given bypass setting 44, the processor can allow execution of all automations 46 (i.e., for the executing process) if the processor detects a given bypass flag comprising a matching assignment statement.

For example, in the following assignment statement comprising a parameter, an operator, and a value:

BypassValidationRules=false the parameter comprises BypassValidationRules, the operator comprises "=" and the value comprises false. In this example, processor 22 will only bypass execution (or allow execution as described hereinabove) if a given bypass flag 52 and a given bypass setting 44 both store matching assignment statements (i.e., matching parameters, matching assignment statements, and matching values).

In some embodiments, there may be multiple bypass flags 52 and multiple bypass settings 44 that use one or more of the bypass embodiments described supra.

In step 70, if the analysis in step 68 indicates that the triggered automation should be performed, then in step 72, processor 22 allows execution (and executes) the triggered automation. However, if the analysis indicates that the triggered automation should be bypassed, then in step 74, processor 22 prevents execution (i.e., bypasses) the triggered automation.

In step 76 processor 22 checks if process 42 is still executing or has completed executing. If process 42 has not completed execution, then in step 78, the processor continues executing the process, and the method continues with step 66. However, if processor 22 has completed executing process 42, then the method ends.

Returning to step 66, if process 42 executing on processor 22 did not trigger a given automation 46, then the method continues with step 76.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for controlling execution of automations that are associated with a table in a database, the method comprising:
   defining respective bypass flags in the automations;
   receiving one or more inputs indicating respective bypass settings for a plurality of processes for managing the table, including at least a first bypass setting for a first process and a second bypass setting, different from the first bypass setting for a second process;
   initiating execution of each of the first and second processes for managing the table;
   responsively to initiation of the execution of each of the first and second processes, comparing the bypass flags to each of the first and second bypass settings so as to determine whether to permit or to bypass each given automation; and
   during the execution of the first and second processes, allowing the execution of the permitted automations, and preventing execution of the bypassed automations including:
      during the execution of the first process, allowing the execution of a given automation having a given bypass flag that matches the first bypass setting; and
      during the execution of the second process, preventing the execution of the given automation when the given bypass flag does not match the second bypass setting.

2. The method according to claim 1, wherein managing the table comprises loading data to the table.

3. The method according to claim 2, wherein the data comprises a first format, wherein the records comprise a second format, and wherein loading the data comprises converting the data from the first format to the second format.

4. The method according to claim 2, wherein loading the data into records of the table comprises copying the data from a first instance of the table to a second instance of the table.

5. The method according to claim 1, wherein managing the table comprises deleting data from the table.

6. The method according to claim 1, wherein managing the table comprises modifying data in the table.

7. The method according to claim 1, wherein the given automation a comprises performing validation.

8. The method according to claim 1, wherein the given automation comprises executing a trigger.

9. The method according to claim 1, wherein the given automation comprises presenting a user interface element.

10. An apparatus for controlling execution of automations that are associated with a table in a database, the apparatus comprising:
a memory configured to store a plurality of processes for managing the table, including at least a first process and a second process; and
a processor configured:
to define respective bypass flags in the automations,
to receive one or more inputs indicating respective bypass settings for the plurality of processes for managing the table, including at least a first bypass setting for the first process and a second bypass setting, different from the first bypass setting for the second process,
to load and initiate execution, from the memory, of each of the first and second processes for managing the table,
responsively to initiation of the execution of each of the first and second processes, to compare the bypass flags to each of the first and second bypass settings so as to determine whether to permit or to bypass each given automation, and
during the execution of the first and second processes, to allow the execution of the permitted automations and prevent execution of the bypassed automations including:
during the execution of the first process, allowing the execution of a given automation having a given bypass flag that matches the first bypass setting; and
during the execution of the second process, preventing the execution of the given automation when the given bypass flag does not match the second bypass setting.

11. The apparatus according to claim 10, wherein the processor is configured to manage the table by loading data to the table.

12. The apparatus according to claim 11, wherein the data comprises a first format, wherein the records comprise a second format, and wherein the processor is configured to load the data by converting the data from the first format to the second format.

13. The apparatus according to claim 11, wherein the processor is configured to load the data into records of the table by copying the data from a first instance of the table to a second instance of the table.

14. The apparatus according to claim 10, wherein the processor is configured to manage the table by deleting data from the table.

15. The apparatus according to claim 10, wherein the processor is configured to manage the table by modifying data in the table.

16. The apparatus according to claim 10, wherein the given automation comprises performing a validation.

17. The apparatus according to claim 10, wherein the given automation comprises executing a trigger.

18. The apparatus according to claim 10, wherein the given automation comprises presenting a user interface element.

19. A computer software product for controlling execution of automations that are associated with a table in a database, the product comprising a non-transitory computer-readable medium, in which program instructions are stored, which instructions, when read by a computer, cause the computer:
to define respective bypass flags in the automations;
to receive one or more inputs indicating respective bypass settings for a plurality of processes for managing the table, including at least a first bypass setting for a first process and a second bypass setting, different from the first bypass setting for a second process;
to initiate execution of each of the first and second processes for managing the table;
responsively to initiation of the execution of each of the first and second processes, to compare the bypass flags to each of the first and second bypass settings so as to determine whether to permit or to bypass each given automation; and
during the execution of the first and second processes, to allow the execution of the permitted automations and to prevent execution of the bypassed automations including:
during the execution of the first process, allowing the execution of a given automation having a given bypass flag that matches the first bypass setting; and
during the execution of the second process, preventing the execution of the given automation when the given bypass flag does not match the second bypass setting.

* * * * *